(12) United States Patent
Bonanno et al.

(10) Patent No.: US 10,908,902 B2
(45) Date of Patent: *Feb. 2, 2021

(54) DISTANCE BASED BRANCH PREDICTION AND DETECTION OF POTENTIAL CALL AND POTENTIAL RETURN INSTRUCTIONS

(71) Applicant: INTERNATIONAL BUSINESS MACHINES CORPORATION, Armonk, NY (US)

(72) Inventors: James J. Bonanno, Wappingers Falls, NY (US); Michael J. Cadigan, Jr., Poughkeepsie, NY (US); Adam B. Collura, Hopewell Junction, NY (US); Daniel Lipetz, Linden, NJ (US); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/165,395

(22) Filed: May 26, 2016

(65) Prior Publication Data

US 2017/0344371 A1 Nov. 30, 2017

(51) Int. Cl.
*G06F 9/30* (2018.01)
*G06F 9/38* (2018.01)

(52) U.S. Cl.
CPC ........ *G06F 9/30058* (2013.01); *G06F 9/3806* (2013.01)

(58) Field of Classification Search
CPC .......................... G06F 9/3806; G06F 9/30058
See application file for complete search history.

(56) References Cited

U.S. PATENT DOCUMENTS

| 5,313,634 | A |   | 5/1994  | Eickemeyer |
| 5,574,871 | A |   | 11/1996 | Hoyt et al. |
| 5,974,543 | A | * | 10/1999 | Hilgendorf ........... G06F 9/3806 711/E12.02 |
| 6,289,444 | B1 |  | 9/2001  | Nair |
| 6,385,720 | B1 | * | 5/2002  | Tanaka ................... G06F 9/325 712/213 |
| 7,082,520 | B2 |  | 7/2006  | Bonanno et al. |

(Continued)

OTHER PUBLICATIONS

Webb, Subroutine Call/Return Stack, Apr. 1, 1988, TDB Apr. 1988, 6 pages, [retrieved from the internet on Jan. 25, 2018], retrieved from URL <ip.com/IPCOM/000057277>.*

(Continued)

*Primary Examiner* — Jyoti Mehta
(74) *Attorney, Agent, or Firm* — Cantor Colburn LLP; William Kinnaman

(57) ABSTRACT

Examples of techniques for distance-based branch prediction are disclosed. In one example implementation according to aspects of the present disclosure, a computer-implemented method includes: determining, by a processing system, a potential return instruction address (IA) by determining whether a relationship is satisfied between a first target IA and a first branch IA; storing a second branch IA as a return when a target IA of a second branch matches a potential return IA for the second branch; and applying the potential return IA for the second branch as a predicted target IA of a predicted branch IA stored as a return.

14 Claims, 6 Drawing Sheets

(56) References Cited

U.S. PATENT DOCUMENTS

| | | | |
|---|---|---|---|
| 7,441,110 B1* | 10/2008 | Puzak | G06F 8/4442 712/207 |
| 2002/0087897 A1* | 7/2002 | Cline | G06F 1/3203 713/300 |
| 2002/0157000 A1* | 10/2002 | Hay | G06F 9/3806 712/239 |
| 2002/0174327 A1 | 11/2002 | Kruckemyer et al. | |
| 2002/0188833 A1 | 12/2002 | Henry et al. | |
| 2008/0126770 A1* | 5/2008 | Morrow | G06F 9/30054 712/233 |
| 2011/0107071 A1* | 5/2011 | Jacob | G06F 9/3804 712/238 |
| 2011/0314259 A1 | 12/2011 | Ekanadham et al. | |
| 2016/0034279 A1 | 2/2016 | Bonanno et al. | |

OTHER PUBLICATIONS

StackOverFlow How do I find the difference between two values without knowing which is larger, Nov. 28, 2012, 5 pages, [retrieved from the internet on Jan. 24, 2018], retrieved from URL <stackoverflow.com/questions/13602170/how-do-i-find-the-difference-between-two-values-without-knowing-which-is-larger>.*

Lopes, Branch Prediction, Oct. 31, 2014, 37 pages, [retrieved from the internet on Jan. 25, 2018], retrieved from URL <web.njit.edu/~rlopes/Mod5.3.pdf>.*

Losq, Subroutine Return Address Stack, Dec. 1, 1981, TDB Dec. 1981, 4 pages, [retrieved from the internet on Jan. 26, 2018], retrieved from URL <ip.com/IPCOM/000048093>.*

André Seznec, "The L-TAGE Branch Predictor", Journal of Instruction-Level Parallelism 9, May 2007, pp. 1-13.

McFarling, Scott "Combining Branch Predictors," WRL Technical Note TN-36m, Digital Western Research Laboratory, Palo Alto, California, Jun. 1993, pp. 1-29.

Ye et al., "A Reliable Return Address Stack: Microarchitectural Features to Defeat Stack Smashing," ACM SIGARCH Computer Architecture News, v.33 n.1, Mar. 2005, pp. 1-8.

Yeh et al., "Alternative Iplementations of Two-Level Adaptive Branch Prediction," Department of Electrical Engineering and Computer Science, Michigan, 19th Annual Symposium on Computer Architecture, 1992, pp. 124-134.

Zaharan et al., "Return-Address Prediction in Speculative Multithreaded Environments," High Performance Computing—HiPC 2002, vol. 2552, pp. 1-10.

List of IBM Patents or Patent Applications Treated as Related; Date Filed: May 26, 2016, p. 1-2.

James J. Bonanno, et al.,"Distance-Based Branch Prediction and Detection", U.S. Appl. No. 15/440,383, filed Feb. 23, 2017, 17 pages.

List of IBM Patents or Patent Applications Treated as Related; Date Filed: Feb. 20, 2019, p. 1-2.

* cited by examiner

DISTANCE BASED BRANCH PREDICTION AND DETECTION OF POTENTIAL CALL AND POTENTIAL RETURN INSTRUCTIONS

BACKGROUND

The present disclosure relates to branch prediction and, in particular, to distance-based branch prediction and detection.

Branch prediction attempts to identify the location of branches in an instruction stream that is being executed by a processor to improve performance. Accuracy is important to avoid costly branch wrong restart penalties. Branch prediction can predict both the direction and target instruction address of a branch. Alternatively, without branch prediction, the pipeline would have to wait for branch resolution before proceeding along the taken or not taken path.

One current solution for predicting the target instruction address is to use a branch target buffer (BTB). The BTB stores what the target instruction address was for a branch the last time the branch was encountered. This approach works well for branches whose target instruction addresses are not a function of the path taken to arrive at the branch. However, for branches whose target instruction addresses are a function of the path taken to arrive at the branch, history based structures may be used, such as a changing target buffer (CTB).

SUMMARY

According to examples of the present disclosure, techniques including methods, systems, and/or computer program products for distance-based branch prediction are provided. An example computer-implemented method may include: determining, by a processing system, a potential return instruction address (IA) by determining whether a relationship is satisfied between a first target IA and a first branch IA; storing a second branch IA as a return when a target IA of a second branch matches a potential return IA for the second branch; and applying the potential return IA for the second branch as a predicted target IA of a predicted branch IA stored as a return.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of distance-based branch prediction. For code with well-defined call and return instructions, a call-return stack (CRS) can be utilized to predict the target of the branch that ends a routine. This may be achieved with an instruction set that includes a call and return type instruction that tells the branch predictor when to "push" and "pop" target instruction addresses from a stack structure.

Implementing a call-return stack in hardware that is based on an instruction set architecture (ISA) that does not have call and return instructions well defined is difficult due to the cost of accurately identifying call-like and return-like instructions. Even if an ISA is enriched with call-return type instructions, the full benefit of a call-return stack is not realized. It is often the case that code is not routinely recompiled if an instruction set is enriched with new instructions, such as call-return type instructions. Furthermore, only select modules of code may be recompiled, leading to cases where some code has either the new call-return instruction but the module it links does not have the corresponding paired instruction. Old code is not able to exploit a new call-return stack prediction mechanism if it requires the use of the new instruction.

In some implementations, the present techniques provide for target instruction address prediction when a branch whose target instruction address is returning from a function. The present techniques enable identifying branches that exhibit call-like characteristics to determine return IA's, and identify branches that exhibit return-like characteristics to apply accurate target IA prediction without architectural changes to the underlying code. This improves the functioning of the underlying processing system by preventing errors and extending functionality to existing (i.e., legacy) programs. For example, a simple call-return stack can be implemented without having to add new call or return type instructions to an instruction set.

Moreover, existing code can exploit the branch prediction techniques described herein without being recompiled, saving processing and memory resources to the benefit of the processing system. This increases the performance of the processing system implementing the code because the code does not have to be recompiled and because the likelihood of corresponding instructions being unpaired is reduced. Additionally, the present techniques may accurately predict call-return like pairs that a traditional branch target buffer or changing target buffer fails to distinguish. These and other advantages will be apparent from the description that follows.

Figure 1:
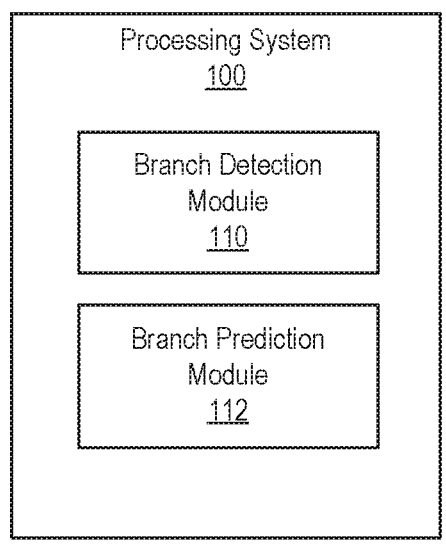
FIG. 1 illustrates a block diagram of a processing system implementing distance-based branch prediction and detection according to examples of the present disclosure.

FIG. 1 illustrates a block diagram of a processing system 100 implementing distance-based branch prediction and detection according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus, a system memory can store program instructions that when executed by processing system 100 implement the engines described herein. Other engines may also be utilized to include other features and functionality described in other examples herein.

Processing system 100 may include a branch detection module 110 and a branch prediction module 112. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The branch detection module 110 performs a branch detection process to determine call-like and return-like branch instructions, for example, at completion time (i.e., past branch instruction execution time). That is, the branch detection method occurs at the point where a branch is known to be actually taken or not (i.e., a non-speculative point) as well as its correct target IA. For every completed branch taken, first, a distance D between the branches' branch instruction address (IA) and its target IA are compared. The distance may be a number of bytes, halfwords, etc. This may be done as an exact or imprecise compare. If the distance is greater than a threshold T, the next sequential IA (NSIA) of the branch instruction is saved in a completion_NSIA side register and marked as valid as a potential call so the return point is known. Next, the target IA of each successive branch is compared with the saved and valid completion_NSIA side register. Some implementations might include the distance D comparison at this step. If the values match, a possible return type branch is indicated. The completion_NSIA side register is marked as invalid, completing the call-return pair, and the possible return is recorded in a branch prediction table. If the values do not match, a possible return type branch is not indicated. It is important to note that in this example implementation, only return-like branches are marked in a branch prediction table. Call-like branches can be marked too in other examples to further improve design and implementation efficiency.

Similar to the branch detection process described above, the branch prediction module 112 performs a branch prediction process whenever a predicted branch is taken. The distance D between the branch IA and the target IA is compared. The distance may be a number of bytes, halfwords, etc. This may be done as an exact or imprecise compare. If the distance D is greater than a threshold T, the NSIA is saved in a prediction_NSIA side register and marked as valid. Next, for every predicted taken branch marked as a return in the branch prediction tables, the value for the target IA stored in the prediction_NSIA side register is used as the target IA prediction if the prediction_NSIA side register is marked as valid. The prediction_NSIA side register is marked as invalid, completing the call-return pair. Otherwise, existing target prediction structures are used. It is important to note that since only return-like branches are marked in the branch prediction tables, call-like branches continue to be predicted by existing branch predictors.

Figure 2:
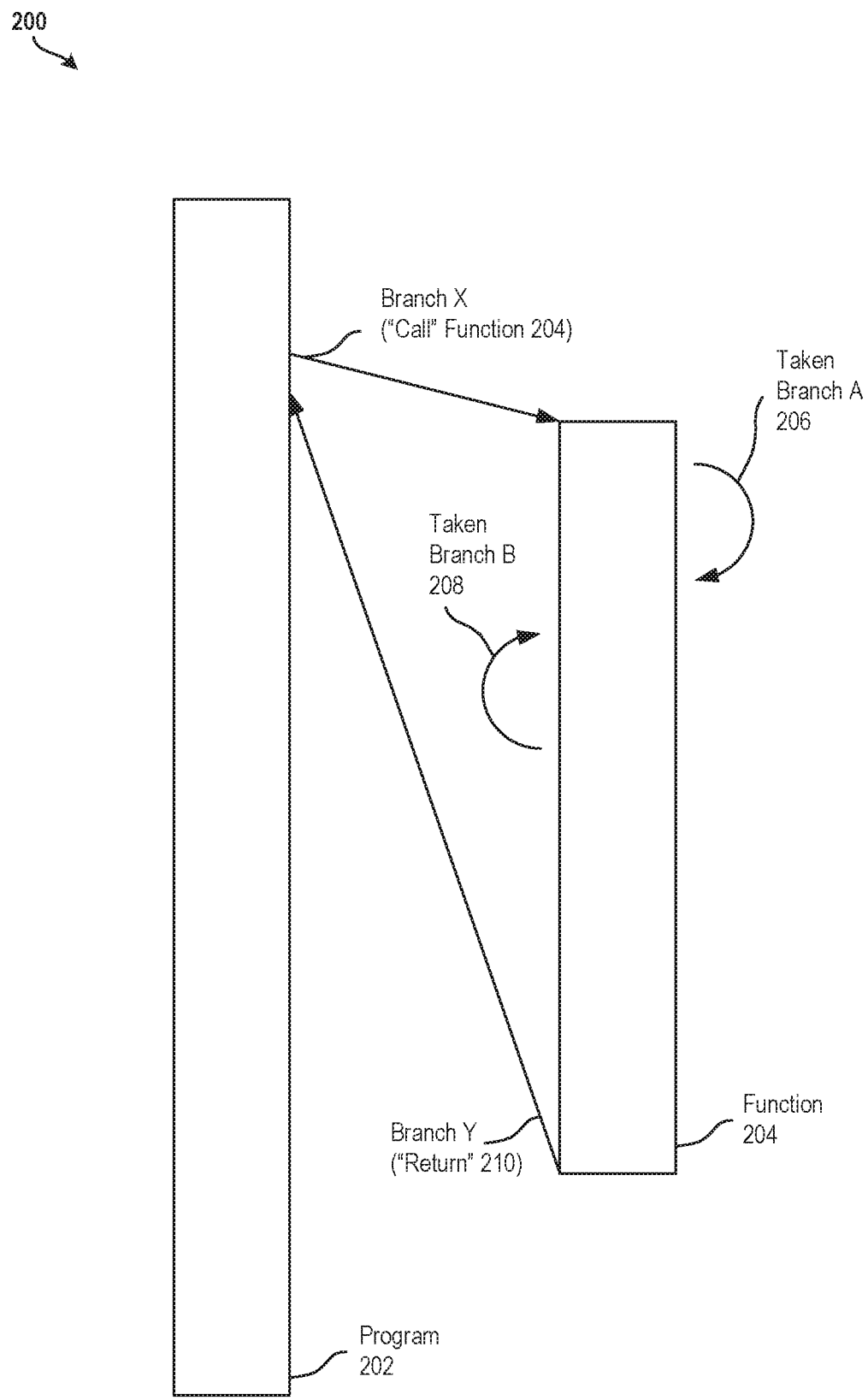
FIG. 2 illustrates an environment implementing distance-based branch prediction and detection in a program according to examples of the present disclosure.

FIG. 2 illustrates an environment 200 implementing distance-based branch detection in a program 202 according to examples of the present disclosure. The environment 200 implements techniques as disclosed herein to detect and predict likely branch pairs that exhibit call-return characteristics. Although illustrated as a one-entry deep queue, the present techniques apply to stacks with depth larger than one. In a stack implementation, there could be multiple instances of NSIA registers and valid bits.

In particular, FIG. 2 illustrates the program 202 and a function 204. A target instruction address (IA) of Branch X (i.e., "call" function 204) occurs at a particular IA (e.g., 0100) which is a distance D bytes away from Branch X's IA (e.g., 0000). If the distance D is greater than the distance threshold T, a next sequential instruction address (NSIA) (e.g., 0002) after the IA for branch X is saved. The target IA of Branch A (i.e., taken branch A 206) is a distance a' bytes away from Branch A's IA. Similarly, the target IA of branch B (i.e., taken branch B 208) is a distance b' bytes away from branch B's IA. In this example, both the distances a' and b' are less than the distance threshold T, and therefore, the completion_NSIA after branch X is not replaced. The targets of branches A and B do not match the NSIA (i.e., 0002) following branch X; however, the target of branch Y (i.e., "return" 210 with IA 0002) does match the NSIA after branch X. This indicates a likely call-return pair.

Figure 3:
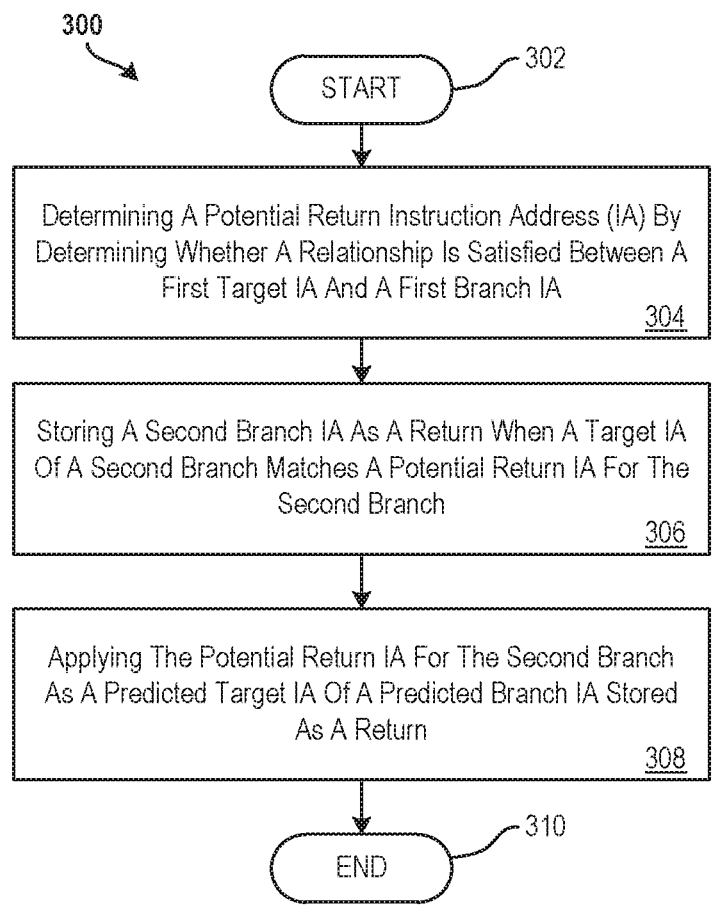
FIG. 3 illustrates a flow diagram of a method for branch detection and prediction according to examples of the present disclosure.

FIG. 3 illustrates a flow diagram of a method 300 for branch detection and prediction according to examples of the present disclosure. The method 300 may be performed, for example, by the processing system 100 of FIG. 1 or by another suitable processing system such as the processing system 20 of FIG. 6. The method 300 starts at block 302 and continues to block 304.

At block 304, the method 300 includes determining, by a processing system, a potential return instruction address (IA) by determining whether a relationship is satisfied between a first target IA and a first branch IA. 4. At block 306, the method 300 includes storing a second branch IA as a return when a target IA of a second branch matches a potential return IA for the second branch. At block 308, the method 300 includes applying the potential return IA for the second branch as a predicted target IA of a predicted branch IA stored as a return. The method continues to block 310 and ends.

Additional details of the branch detection and prediction are disclosed below with reference to FIGS. 4 and 5 respectively. Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
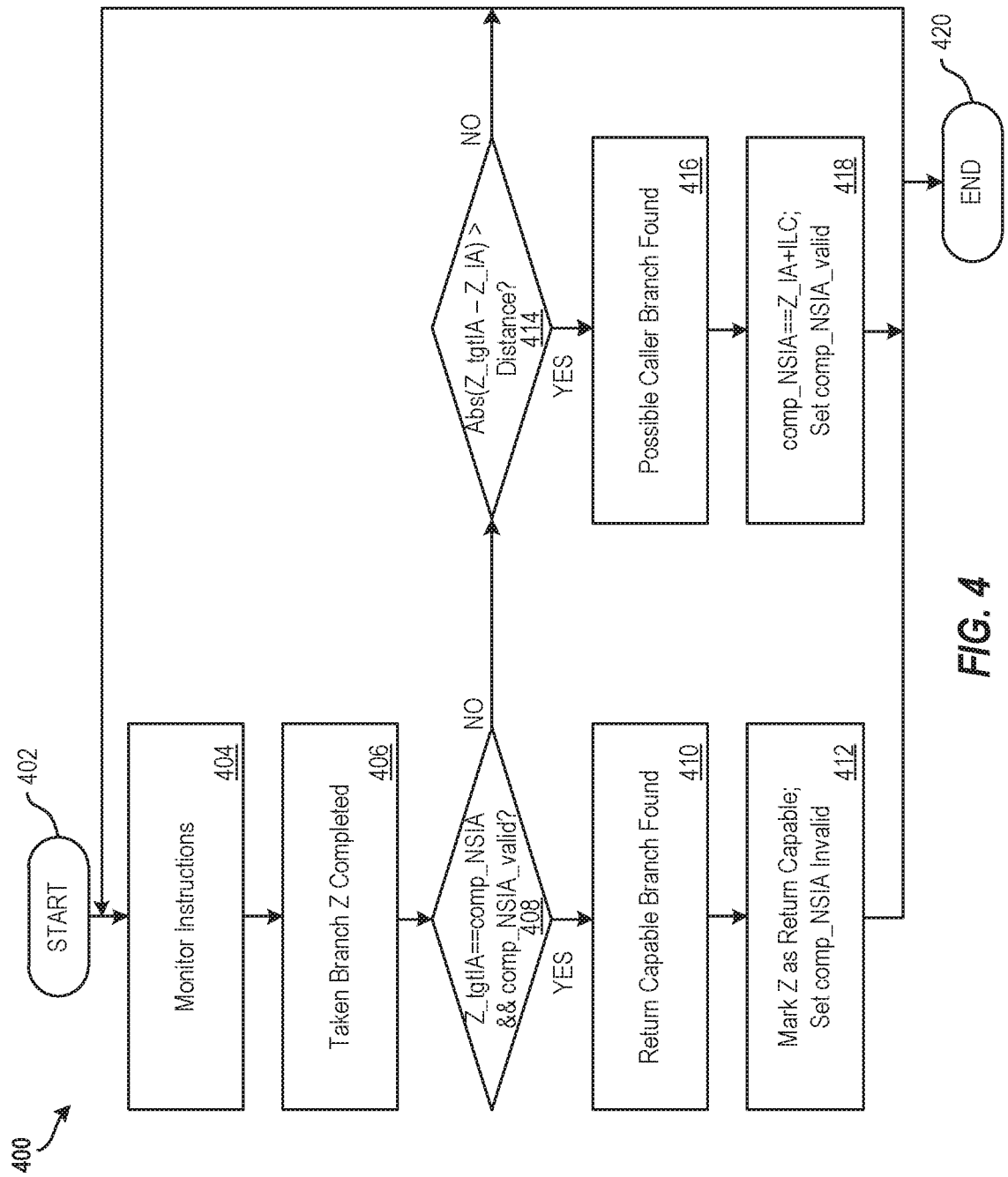
FIG. 4 illustrates a flow diagram of a method for branch detection according to examples of the present disclosure.

FIG. 4 illustrates a flow diagram of a method 400 for branch detection according to examples of the present disclosure. The method 400 may be performed, for example, by the processing system 100 of FIG. 1 or by another suitable processing system such as the processing system 20 of FIG. 6.

The method 400 starts at block 402 and continues to block 404. At block 404, the method 400 includes monitoring instructions and, at block 406, detecting that a branch (e.g., branch Z) was taken and is completed. At decision block 408, it is determined whether Z's target IA is equal to the value stored in a completion_NSIA register and whether the completion_NSIA register is valid (i.e., whether a potential return is found). If so, at block 410, the method 400 indicates that a return capable branch is found and, at block 412, Z is marked as return capable and the completion_NSIA register is set as invalid. Marking Z as return capable may include marking Z's metadata as return capable, for example, in a branch prediction table. The method 400 continues to block 420 and terminates in some examples. In other examples, the method 400 continues back to monitor additional instructions at block 404.

However, if at decision block 408, it is determined that Z's target IA is not equal to the value stored in a completion_NSIA register and/or it is determined that the completion_NSIA register is invalid, the method 400 continues to decision block 414 where the target IA for Z is compared to a threshold distance. If the target IA for Z is greater than the threshold distance away from branch Z's IA, a possible caller branch is indicated at block 416. It should be appreciated that, in examples, the distance between the target IA and branch Z's IA is determined using an absolute value function. At block 418, the completion_NSIA is set to equal branch Z's IA plus an instruction length code (e.g., 2 bytes, 4 bytes, 6 bytes, 8 bytes, etc.) and the completion_NSIA is set as valid. The method 400 continues to block 420 and terminates in some examples. In other examples, the method 400 continues back to monitor additional instructions at block 404.

If at decision block 414, the target IA for Z is not greater than the threshold distance away from branch Z's IA, the method 400 continues back to search monitor instructions at block 404.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
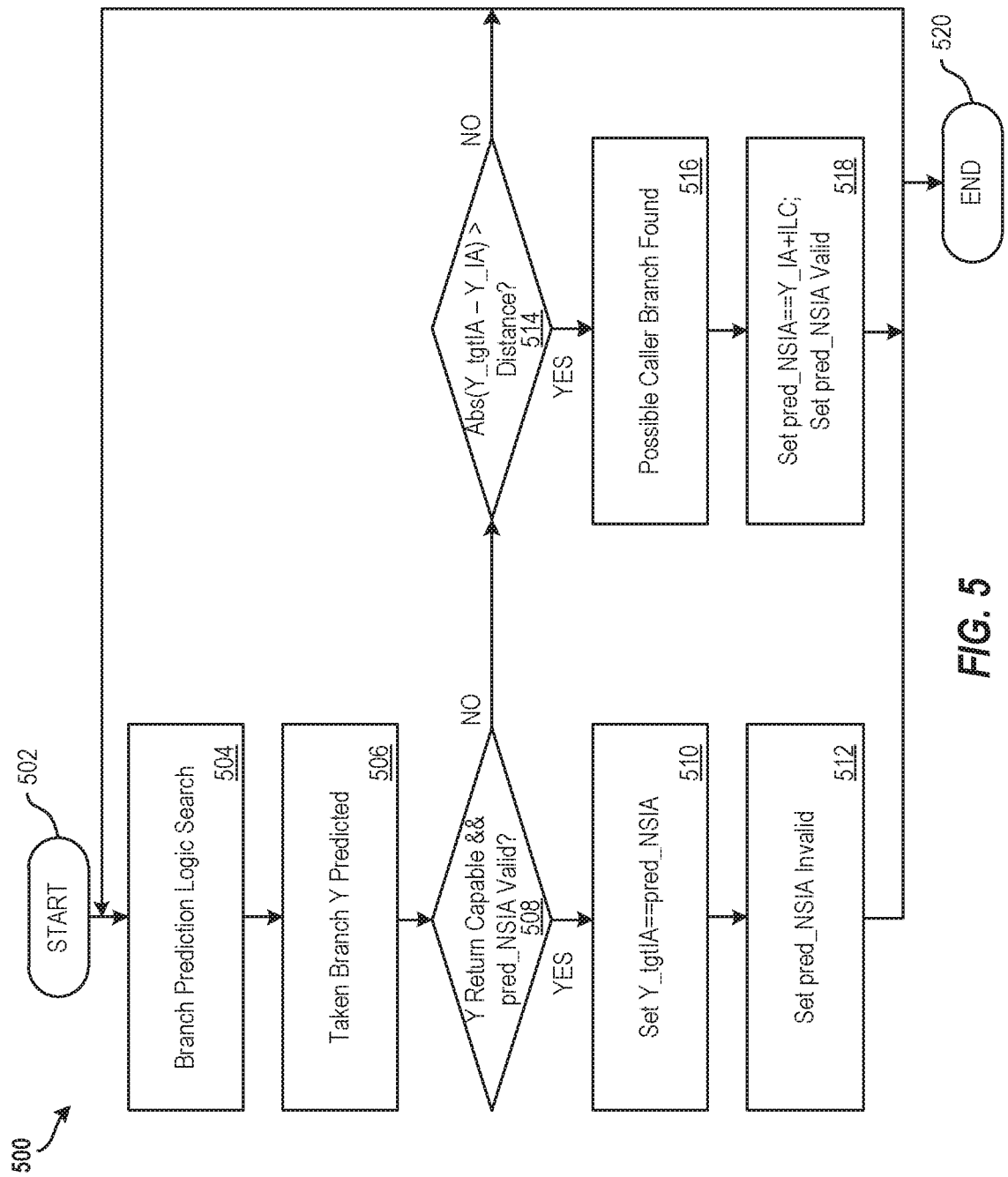
FIG. 5 illustrates a flow diagram of a method for branch prediction according to examples of the present disclosure.

FIG. 5 illustrates a flow diagram of a method 500 for branch prediction according to examples of the present disclosure. The method 500 may be performed, for example, by the processing system 100 of FIG. 1 or by another suitable processing system such as the processing system 20 of FIG. 6.

The method 500 starts at block 502 and continues to block 504. At block 504, the method 500 includes performing a branch prediction logic (BPL) search. At block 506, a taken branch Y is predicted. At decision block 508, it is then determined whether branch Y is return capable and whether a predicted_NSIA side register is valid. If so, at block 510, the method 500 includes setting the predicted_NSIA side register as the target IA for branch Y, and setting the predicted_NSIA side register as invalid at block 512. The method 500 continues to block 520 and terminates in some examples. In other examples, the method 500 continues back to search the BPL at block 504.

However, if at decision block 508, it is determined that branch Y is not return capable and/or that the predicted_NSIA side register is invalid, the method 500 continues to decision block 514. If at decision block 514 it is determined that the target IA for Y is greater than a threshold distance away from branch Y's IA, a possible caller branch is found at block 516. It should be appreciated that, in examples, the distance between the target IA and branch Y's IA is determined using an absolute value function. The predicted_NSIA side register is then set equal to the IA for Y plus an instruction length code and the predicted_NSIA side register is set as valid, as shown at block 518. Similar to other auxiliary target IA prediction structures like the CTB, a return capable branch can only use the predicted_NSIA side register's value if the predicted branch had previously taken a wrong target (i.e., in a previous prediction, the same branch's target IA was incorrect). The method 500 continues to block 520 and terminates in some examples. In other examples, the method 500 continues back to search the BPL at block 504.

If at decision block 514, the target IA for Y is not greater than the threshold distance away from branch Y's IA, the method 500 continues back to search the BPL at block 504.

In addition to typical metadata stored in each branch prediction entry, such as a branch direction history, etc., each branch stored also saves its instruction length code, indicating the length of the instruction (e.g., in bytes). This may not be necessary for some architectures with fixed instruction lengths or configurations where the branch is represented in the branch prediction entry by its ending instruction address—for example the last byte address of the instruction.

Figure 6:
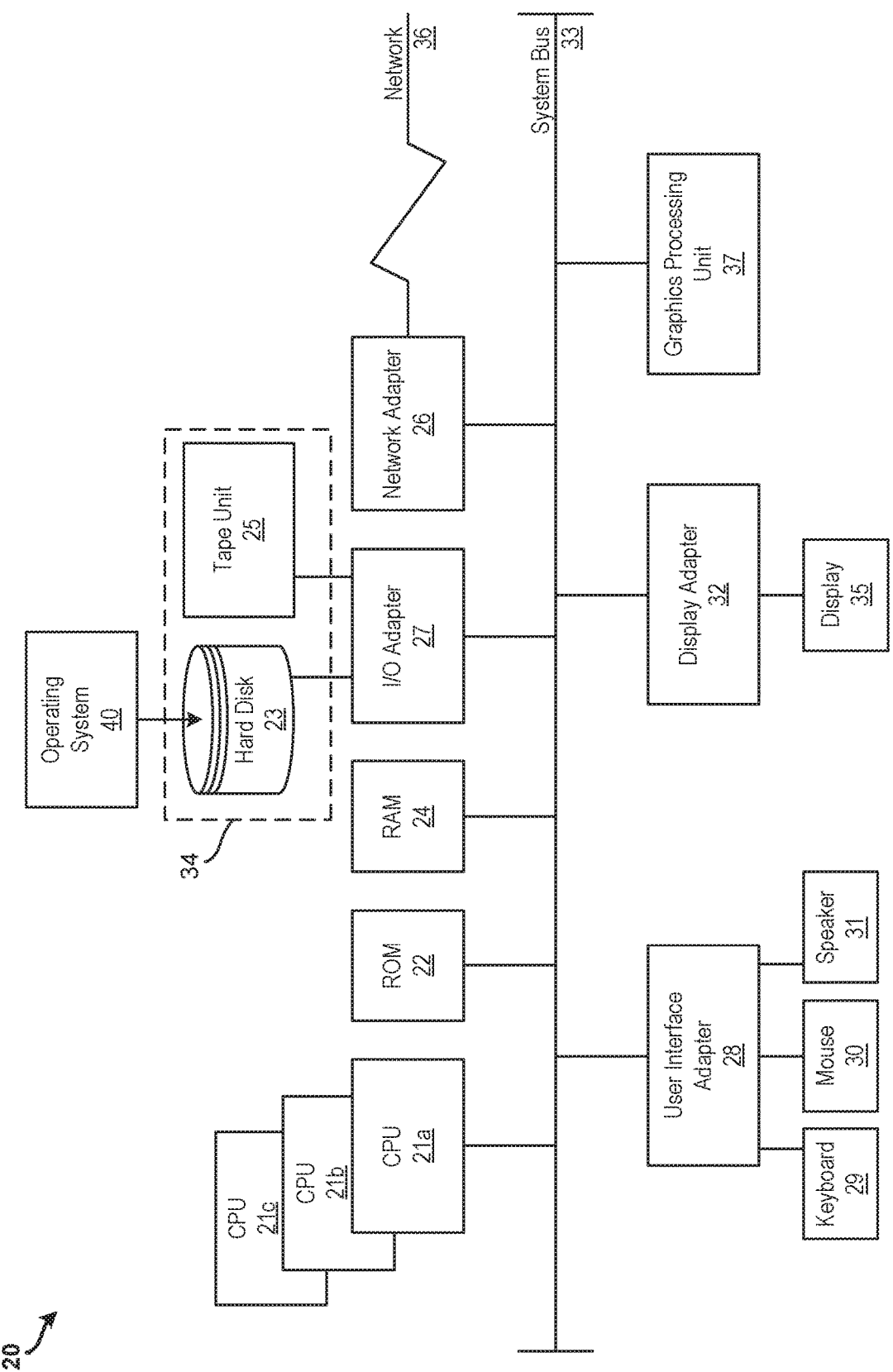
FIG. 6 illustrates a block diagram of a processing system for implementing the techniques described herein according to examples of the present disclosure.

Additional processes also may be included, and it should be understood that the processes depicted in FIG. 6 represent illustrations, and that other processes may be added or existing processes may be removed, modified, or rearranged without departing from the scope and spirit of the present disclosure.

It is understood in advance that the present disclosure is capable of being implemented in conjunction with any other type of computing environment now known or later developed. For example, FIG. 6 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed:

1. A system for distance-based branch prediction, the system comprising:
    a memory having computer readable instructions;
    a branch detection module;
    a brand prediction module; and
    a processing device for executing the computer readable instructions, the computer readable instructions when executed by the processing device cause the processing device to perform:
        determining a potential return instruction address (IA) by determining whether a relationship is satisfied between a first target IA and a first branch IA, wherein the relationship is a distance between the first target IA and the first branch IA, wherein the distance is a magnitude;
        indicating a possible caller branch for the first target IA exists based on the relationship between the first target IA and the first branch IA;
        storing a second branch IA as a return based on a target IA of a second branch and a potential return IA for the second branch; and
        applying the potential return IA for the second branch as a predicted target IA of a predicted branch IA stored as a return.

2. The system of claim 1, wherein the distance between the first target IA and the first branch IA is a number of bytes.

3. The system of claim 1 wherein, the distance between the first target IA and the first branch IA is determined using an absolute value function.

4. The system of claim 1, wherein the storing comprises:
    storing the second branch IA into a branch target buffer (BTB); and
    marking the second branch in the BTB as a return branch.

5. The system of claim 1, wherein indicating the possible caller branch occurs when the distance between the first target IA and the first branch IA is greater than a threshold distance.

6. A computer program product for distance-based branch prediction, the computer program product comprising:
    a non-transitory computer readable storage medium having program instructions embodied therewith, the program instructions executable by a processing device to cause the processing device to:
        determine a potential return instruction address (IA) by determining whether a relationship is satisfied between a first target IA and a first branch IA, wherein the relationship is a distance between the first target IA and the first branch IA, wherein the distance is a magnitude;
        indicate a possible caller branch for the first target IA exists based on the relationship between the first target IA and the first branch IA;
        store a second branch IA as a return based on a target IA of a second branch and a potential return IA for the second branch; and
        apply the potential return IA for the second branch as a predicted target IA of a predicted branch IA stored as a return.

7. The computer program product of claim 6, wherein the distance between the first target IA and the first branch IA is a number of bytes.

8. The computer program product of claim 6, wherein the distance between the first target IA and the first branch IA is determined using an absolute value function.

9. The computer program product of claim 6, wherein indicating the possible caller branch occurs when the distance between the first target IA and the first branch IA is greater than a threshold distance.

10. A computer-implemented method for distance-based branch prediction, the method comprising:
    determining, by a processing system, a potential return instruction address (IA) by determining whether a relationship is satisfied between a first target IA and a first branch IA, wherein the relationship is a distance between the first target IA and the first branch IA;
    indicating a possible caller branch for the first target IA exists based on the relationship between the first target IA and the first branch IA;
    storing a second branch IA as a return based on a target IA of a second branch and a potential return IA for the second branch; and
    applying the potential return IA for the second branch as a predicted target IA of a predicted branch IA stored as a return.

11. The computer-implemented method of claim 10, wherein the distance between the first target IA and the first branch IA is a number of bytes.

12. The computer-implemented method of claim 10, wherein the distance between the first target IA and the first branch IA is determined using an absolute value function.

13. The computer-implemented method of claim 10, wherein the storing comprises:
    storing the second branch IA into a branch target buffer (BTB); and
    marking the second branch in the BTB as a return branch.

14. The computer-implemented method of claim 10, wherein indicating the possible caller branch occurs when the distance between the first target IA and the first branch IA is greater than a threshold distance.

* * * * *